United States Patent
Butterworth et al.

(10) Patent No.: US 7,284,105 B2
(45) Date of Patent: Oct. 16, 2007

(54) FAST AND ECONOMICAL ESTABLISHMENT OF REMOTE COPY

(75) Inventors: Henry Esmond Butterworth, Eastleigh (GB); Carlos Francisco Fuente, Portsmouth (GB); Robert Frederic Kern, Tuscon, AZ (US); Robert Bruce Nicholsen, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 10/660,043

(22) Filed: Sep. 10, 2003

(65) Prior Publication Data

US 2005/0052921 A1   Mar. 10, 2005

(51) Int. Cl.
*G06F 12/00* (2006.01)
(52) U.S. Cl. .................................. 711/162
(58) Field of Classification Search ............ None
See application file for complete search history.

(56) References Cited

U.S. PATENT DOCUMENTS 5,835,953 A * 11/1998 Ohran ................. 711/162
6,941,429 B1 * 9/2005 Kamvysselis et al. ...... 711/162

* cited by examiner

*Primary Examiner*—Hyung Sough
*Assistant Examiner*—Duc T. Doan
(74) *Attorney, Agent, or Firm*—Dillon & Yudell LLP

(57) ABSTRACT

A storage apparatus is operable as primary in a remote copy pair and comprises a remote copy component operable to establish a remote copy relationship between said primary and a secondary; a copy component operable at the primary to create a copy for download onto a portable physical storage medium for offline transport to the secondary for upload; a synchronization component for synchronizing data at said secondary with data at said primary using an online link in response to a request for synchronization from the secondary; a metadata component operable to store a dirty state indicator of a portion of a storage space at the primary after establishment of the remote copy relationship at the primary; and the metadata component being operable to limit synchronization at the secondary to the portion of storage having a dirty state indicator at the primary.

22 Claims, 3 Drawing Sheets

FAST AND ECONOMICAL ESTABLISHMENT OF REMOTE COPY

FIELD OF THE INVENTION

The present invention relates to the field of computer storage management, and particularly to advanced function storage systems providing a Remote Copy function.

BACKGROUND OF THE INVENTION

The value of data stored in computer systems is already very high, and that value is constantly increasing. The danger posed to governments, businesses and other organisations of losing data because of accidental or malicious events is regularly emphasised by reports of destructive "cracker" attacks, earthquakes, fires and other events which have left organisations unable to access data and continue operations. In some cases, businesses have failed because such an event has left them without adequate recovery capabilities. There are other circumstances, too, in which maximum continuity is necessary. Migration of a data processing facility to new premises can also cause disruption to normal business activities, and this poses a significant additional cost.

There is thus an increasing need for the use of business continuity facilities, including remote backup data storage and processing capability. The establishing of these business continuity systems and copying and keeping the remotely-stored backup data in step with that at the main site or system is a significant business and technical effort and can involve considerable investment.

The main technology that is increasingly used for such business continuity solutions is known as Remote Copy. In this technology, a set of source logical disks are used at the primary site (hereinafter simply referred to as the "primary"), while a set of target logical disks at the secondary site (hereinafter referred to as the "secondary"), are kept in synchronization with the source logical disks. The target logical disks are typically at a site that is geographically remote from the main site at which the source logical disks are kept. If an adverse event of any kind destroys the disks or the data at the primary, or in any way makes the data unavailable or unusable, the business can be continued using the data at the secondary. In the same manner, if a migration is planned, it can be staged to maximise the continuity of business operations using Remote Copy.

There are essentially two types of Remote Copy: synchronous and asynchronous. In synchronous Remote Copy, the destination logical disks are kept in lockstep with the source logical disks. That is, in synchronised Remote Copy, the requesting application does not receive completion to writes until both logical disks have been updated. In asynchronous Remote Copy, the destination logical disk writes may lag behind the source logical disk writes for some period of time. This difference is not material to the present description, and therefore for the sake of simplicity the description will only discuss synchronous Remote Copy.

One conventional current best practice technique for establishing a remote copy operation is described below with reference to FIG. 1. It involves taking a backup copy (102) of the primary database using, for example, a conventional backup method such as a tape dump utility. The contents of the tape are then either transmitted via a network or the backup tape is taken to the secondary and loaded (104). A remote copy of a volume containing the database redo logs is created (106)—this contains records of all the changes made to the primary since the taking of the backup copy (102). The redo log is then synchronised (108) to the secondary. The database is quiesced (110) at the primary. The redo logs are then reapplied (112) at the secondary. The remote copy of the data volumes is activated (114). Finally, the primary is reactivated (116).

It will be clear to one skilled in the art that this process is burdensome and potentially very costly to the business as the customer's applications are taken offline during the performance of steps 110 to 116. In addition, because it relies on undo-redo logging, and because ordinary flat-file systems of the art do not usually benefit from this type of logging, this technique cannot be used for all types of data storage.

An alternative technique would be to establish a remote copy relationship between a primary and a secondary site in which the storage at the secondary site is initially empty, and then to use conventional techniques to initiate synchronization at the remote secondary during continuing operation at the primary. This technique has several disadvantages. The first is that the process lasts an indefinite amount of time, during which the system is vulnerable to data loss if any failures occur at the primary. The second is that the connection between the primary and secondary sites is, in most cases, an expensive private leased line, such as a T1 line. Transmission of large amounts of data over such a line without any rapidly-established level of protection for the data is not generally acceptable as a reasonable business expense.

It would therefore be desirable to advantageously increase the speed with which a remote copy could be established, while avoiding the need to quiesce applications at the primary, allowing all types of data to be included in the scope of the remote copy. It would be further desirable to minimize the use of network resources and costs in establishing the remote copy.

SUMMARY OF THE INVENTION

The present invention accordingly provides, in a first aspect, a storage apparatus operable as primary in a remote copy pair comprising: a remote copy component operable to establish a remote copy relationship between said primary and a secondary; a copy component operable at said primary to create a copy for download onto a portable physical storage medium for offline transport to said secondary for upload; a synchronization component for synchronizing data at said secondary with data at said primary using an online link in response to a request for synchronization from said secondary; a metadata component operable to store a dirty state indicator of a portion of a storage space at said primary after establishment of said remote copy relationship at said primary; and said metadata component being operable to limit synchronization at said secondary to said portion of storage having said dirty state indicator at said primary.

Preferably, said metadata component comprises a bitmap and said portion of said storage space is a grain of data.

A storage apparatus of the first aspect is further operable as a secondary in a remote copy pair and comprising: a loading component for uploading said copy from said portable physical storage medium; a suppressing component for suppressing synchronization from a metadata component in said secondary; and a requester component for requesting synchronization of data at said secondary with data at said primary using an online link.

Preferably, said online link comprises a storage area network.

Preferably, said copy component comprises a Flash Copy component.

In a preferred aspect there is provided a storage adapter card comprising a storage apparatus of the first aspect.

In a further preferred aspect there is provided a storage virtualization engine comprising a storage adapter card of the first preferred aspect.

In a second aspect, the present invention provides a method of operating a storage apparatus as primary in a remote copy pair comprising the steps of: establishing a remote copy relationship between said primary and a secondary; creating a copy of a storage space for download onto a portable physical storage medium for offline transport to said secondary for upload; synchronizing data at said secondary with data at said primary using an online link in response to a request for synchronization from said secondary; storing, in a metadata component, a dirty state indicator of a portion of a storage space at said primary after establishment of said remote copy relationship at said primary; and said metadata component being operable to limit synchronization at said secondary to said portion of storage having said dirty state indicator at said primary.

In preferred features of the second aspect there are provided method steps corresponding to the cooperating structures of the preferred features of the first aspect.

In a third aspect, there is provided a computer program product comprising computer program code tangibly embodied in a computer-readable storage medium to, when loaded into a computer system and executed thereon, cause said computer system to operate a storage apparatus as primary in a remote copy pair by performing the computer program code steps of: establishing a remote copy relationship between said primary and a secondary; creating a copy of a storage space for download onto a portable physical storage medium for offline transport to said secondary for upload; synchronizing data at said secondary with data at said primary using an online link in response to a request for synchronization from said secondary; storing, in a metadata component, a dirty state indicator of a portion of a storage space at said primary after establishment of said remote copy relationship at said primary; and limiting, by said metadata component, synchronization at said secondary to said portion of storage having said dirty state indicator at said primary.

In preferred features of the third aspect there are provided computer program code steps corresponding to the method steps of the preferred features of the second aspect.

In a fourth aspect there is provided a method of deploying a computerized business continuity service by operating a customer storage apparatus as primary in a remote copy pair comprising the steps of: establishing a remote copy relationship between said primary and a secondary; creating a copy of a storage space for download onto a portable physical storage medium for offline transport to said secondary for upload; synchronizing data at said secondary with data at said primary using an online link in response to a request for synchronization from said secondary; storing, in a metadata component, a dirty state indicator of a portion of a storage space at said primary after establishment of said remote copy relationship at said primary; and said metadata component being operable to limit synchronization at said secondary to said portion of storage having said dirty state indicator at said primary.

In preferred features of the second aspect there are provided service deployment method steps corresponding to the cooperating structures of the preferred features of the first aspect, to the method steps of the second aspect, and to the computer program code steps of the third aspect.

BRIEF DESCRIPTION OF THE DRAWINGS

A preferred embodiment of the present invention will now be described by way of example only, with reference to the accompanying drawings, in which.

DETAILED DESCRIPTION OF THE PREFERRED EMBODIMENT

Figure 1:
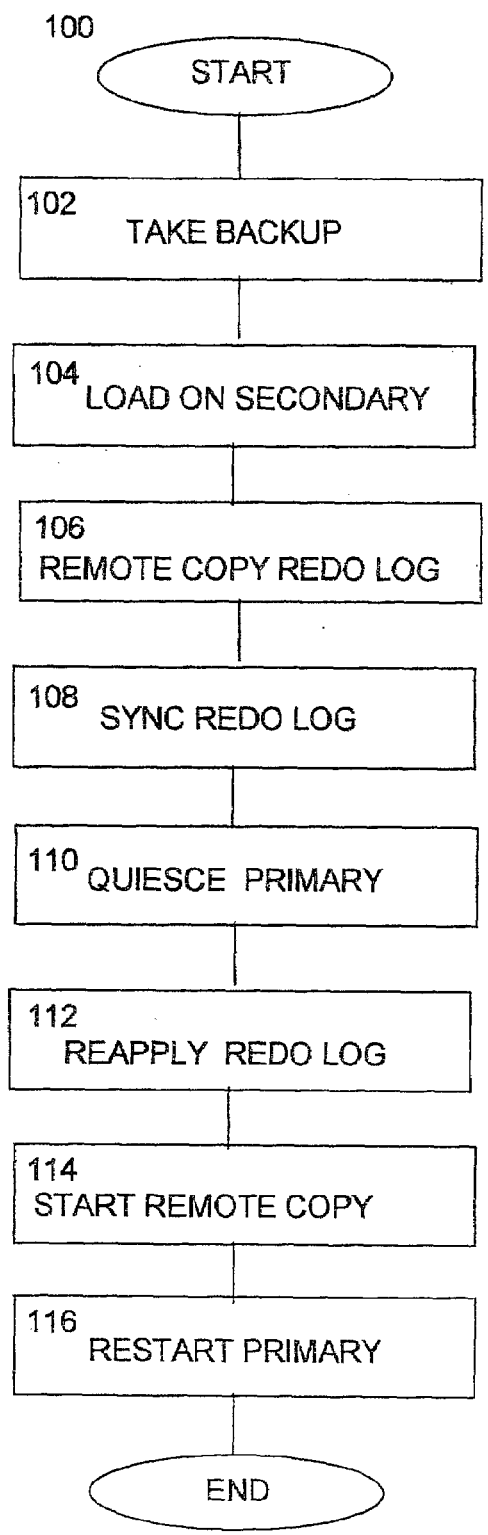
FIG. 1 is a flow diagram illustrating a database-related remote copy establishment system of the prior art.

As described above, one technique for business continuity is the use of an offsite remote copy of the data which is kept in synchronization with the data at the normal business processing location. Remote Copy is a technique for achieving this.

There already exist well-known techniques for synchronizing data between systems in which data that has been written at either location can be desynchronized after a break in communications. These techniques can be seen in portable computers and handheld devices that can be synchronized with other systems, such as host database systems, to return each to a consistent state with respect to the other from time to time without requiring a permanent communications link. Resynchronization is typically done by retaining metadata describing the state of the data at each location, so that any changes can be noted and the two sites can return to a consistent state after reestablishment of the connection. The structure that is typically used to record the state of the data is to mark each record, block, or other unit of storage as being "clean", meaning that the unit of storage can be used directly or "dirty" meaning that it cannot be used without first being synchronized. This can be done either by marking the block or its directory entry, or by mapping the whole storage space using, for example a bitmap. During the time that the systems are out of communication, their metadata is potentially diverging. On restoration of the link between the systems, the data can be desynchronized by copying every unit of storage marked as having been written at either the primary system or the secondary system from the primary to the secondary, thus applying to the secondary changes made at the primary but not at the secondary and overwriting at the secondary any changes made at the secondary during the loss of communications that were not also made at the primary.

In conventional remote copy arrangements, synchronization of a new backup copy with the primary is performed when the Remote Copy relationship between the primary and secondary is initialized. The secondary examines its bitmap or other metadata, discovers that none of the data has been copied across (and thus all the bits in the bit map indicate that the data is dirty) and requests synchronization of all the data. The primary receives the synchronization request and begins sending all the data to the secondary. As discussed above, this is a time-consuming and expensive process, during which the primary and secondary also remain out-of-synchronization, making the data vulnerable. As the transfer of data takes place across an expensive dedicated link, the cost of doing this has become a burden that businesses wish to eliminate or alleviate.

Embodiments of the present invention, as will be seen, address the problem by enabling a more rapid establishment of the remote copy, whereby the data is more quickly brought into a usable state to operate as a business continuity solution, and in which the costs and resource burdens of the establishing process are brought down to an acceptable level.

Figure 2:
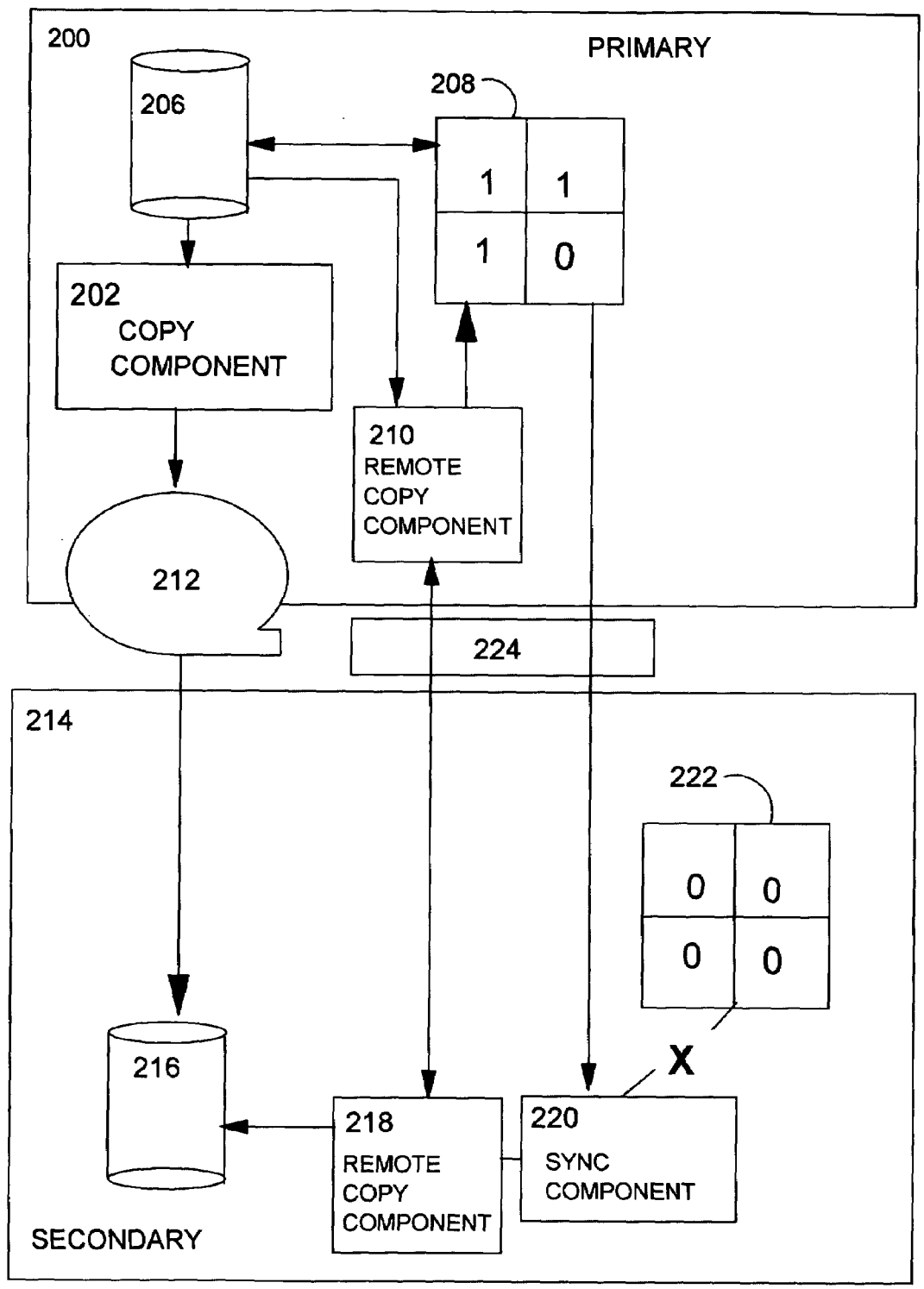
FIG. 2 shows in schematic form the components of an apparatus according to the preferred embodiment of the present invention.
Figure 3:
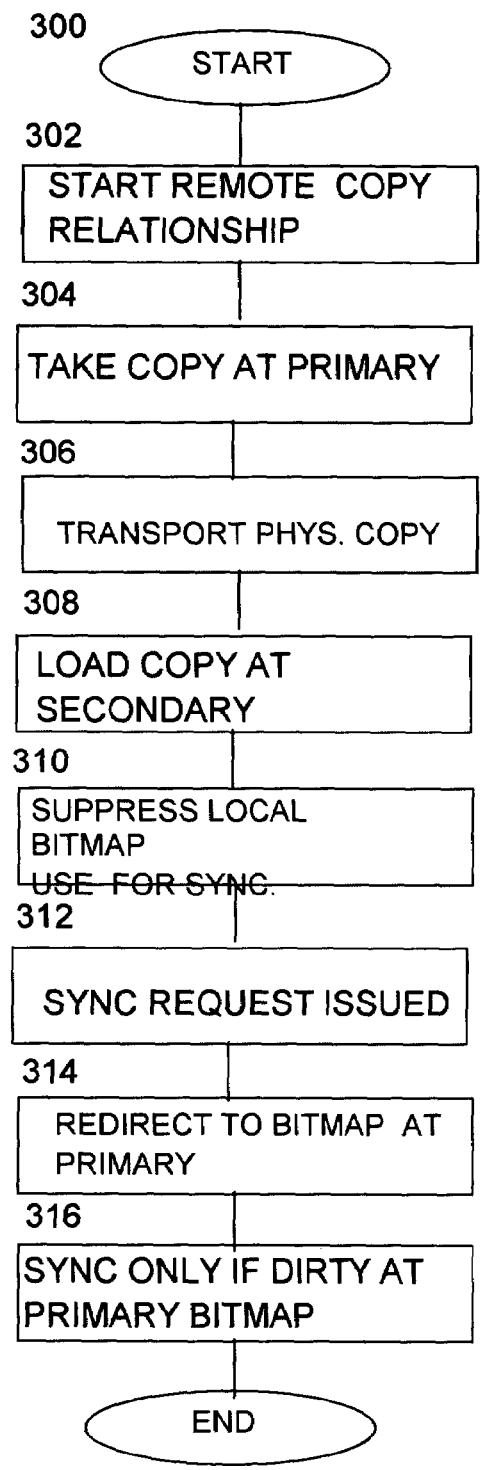
FIG. 3 shows the steps of a method according to the preferred embodiment of the present invention.

The presently most preferred embodiment of the present invention will be more clearly understood with reference to FIGS. 2 and 3.

In FIG. 2 is shown a storage apparatus which is operable as the primary (200) in a remote copy pair. The apparatus has a copy component (202) that is used to take a copy of the source logical disk storage at the primary and copy the data onto a portable physical storage medium (212) for offline transport to a secondary (214) for loading. The copy component may most suitably be a Flash Copy component.

Flash Copy is an advanced storage function by which a second image of some data is made available. (This function is sometimes also known as a Point-in-Time copy, or T0-copy.) The second image's contents are initially identical to those of the first, as will be described below. The second image is made available 'instantly' by means of a system of pointers to the first. In practical terms this means that the second image is made available in much less time than would be required to create a true, separate, physical copy, and thus it can be established without unacceptable disruption to a using application's operation.

The first copy continues to be used for its original purpose by the original using application. This contrasts favorably with backup without using Flash Copy, in which the application must be shut down, and the backup taken, before the application can be restarted again.

The apparatus of the preferred embodiment further includes a Remote Copy component (210) to establish a remote copy relationship between the primary (200) and the secondary (214) of the remote copy pair, such that the primary is aware that it has a secondary, even though the secondary may not yet have been connected-to using any communications link. The Remote Copy component (210) at the primary (200) uses metadata control component (208) to store the "dirty" state indicators for each portion of the storage space (206) that has been written at the primary after the start of the remote copy relationship.

At the secondary (214), when the copy taken from the primary has been uploaded, the Remote Copy synchronization component (218), has been adapted to suppress its normal initialization-time behavior of synchronization based on its own metadata component (222), but instead to request synchronization based on the metadata held by metadata component (222) a the primary.

Thus, in response to a request from the secondary (214) in the remote copy pair to synchronize data (216) at the secondary (214) with data (206) at the primary (200) using online link (224), the synchronization component (220) at the secondary (214) has been adapted so that the write activity from the primary (200) to the secondary (214) is limited to those portions of storage (206) having a "dirty" state indicator in the metadata component (208) at the primary. In this manner, the synchronization component at the secondary acquires its metadata from metadata component (208) at the primary, and uses that as the basis for the writing of data by the remote copy component (218) at the secondary to limit the number of writes as described above to the "dirty" data, or in other words, to the data that has diverged from synchronization since the establishment of the Remote Copy relationship.

As will be clear to one skilled in the art, the metadata components (208, 222) may suitably be embodied as bitmaps, wherein each bit may represent some uniformly-sized or approximately uniformly-sized assemblage of data. Such an assemblage of data is conventionally called a grain.

In an alternative, a synchronization data structure in the form of a tree or other indexing mechanism can be used.

As will be clear to one skilled in the art, online link (224) may, for example, comprise a fiber optic communications means, any wired or wireless communications means, or any combination thereof.

Turning now to FIG. 3, there are shown the steps of a method of operating a storage apparatus in a remote copy pair according to a preferred embodiment of the present invention.

A Remote Copy relationship is established (302) between the primary and the secondary. This is done by starting the primary, informing it that it has a secondary, but not initiating any writes to the secondary. Until the Remote Copy relationship "goes live" and synchronization begins, the metadata component (208) at the primary is used to record indications that regions of data at the primary have become "dirty" since the establishment of the Remote Copy relationship.

At step (304) a copy is taken and the data is stored on a portable physical storage medium for offline transport to a secondary for upload. Most suitably, the copying technique used is Flash Copy. Further suitably, the Flash Copy is taken as close to the time of the establishment of the Remote Copy relationship as possible, to avoid unnecessary synchronization of data that is in fact up-to-date in the Flash Copy, but has been marked as "dirty" in the metadata component (208) at the primary in the interval between the two events, because it has changed since the initiation of the Remote Copy relationship.

When the copy has been taken (304), it is transported (306) to the remote location and loaded (308) at the secondary. At step (310) the normal behavior of the synchronization component at the secondary is suppressed, so that it does not access its own metadata component determine what data needs to be synchronized. Instead the secondary's request for metadata to control synchronization is redirected to the metadata component at the primary. In a conventional Remote Copy relationship, the secondary is initialized with its metadata component indicating that all the data is dirty and must be copied from the primary. However, in preferred embodiments of the present invention, the secondary's function of examining the secondary bitmap and requesting all the data is suppressed. Instead, the secondary is redirected so that it "sees through" its own bitmap to the bitmap at the primary. Thus, when the primary receives the request (314), the metadata control component ensures (316) that synchronization is performed only on those regions of storage having a "dirty" state indicator in the metadata component at the primary.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It will also be appreciated that various further modifications to the preferred embodiment described above will be apparent to a person of ordinary skill in the art.

What is claimed is:

1. A storage apparatus operable as primary in a remote copy pair comprising:
    a remote copy component operable to establish a remote copy relationship between said primary, storing a primary copy, and a secondary, storing a secondary copy;
    a copy component operable at said primary to create a tertiary copy for download onto a portable physical storage medium for offline transport to said secondary for upload;
    a synchronization component for synchronizing data at said secondary with data at said primary using an online link in response to a request for synchronization from said secondary;
    a metadata component operable to store a dirty state indicator of a portion of a storage space at said primary after establishment of said remote copy relationship at said primary; and
    said metadata component being operable to limit synchronization of said secondary copy when unloading said tertiary copy from said portable physical storage medium at said secondary to said portion of storage having said dirty state indicator at said primary.

2. A storage apparatus as claimed in claim 1, wherein said metadata component comprises a bitmap and said portion of said storage space is a grain of data.

3. A storage apparatus as claimed in claim 1, further operable as a secondary in a remote copy pair and comprising:
    a loading component for uploading said tertiary copy from said portable physical storage medium;
    a suppressing component for suppressing synchronization from a metadata component in said secondary; and
    a requester component for requesting synchronization of data at said secondary with data at said primary using an online link.

4. A storage apparatus as claimed in claim 1, wherein said online link comprises a storage area network.

5. A storage apparatus as claimed in claim 1, wherein said copy component comprises a Flash Copy component.

6. A storage adapter card comprising a storage apparatus as claimed in claim 1.

7. A storage virtualization engine comprising a storage adapter card as claimed in claim 6.

8. A method of operating a storage apparatus as primary in a remote copy pair comprising the steps of:
    establishing a remote copy relationship between said primary, storing a primary copy, and a secondary, storing a secondary copy,
    creating a tertiary copy of a storage space for download onto a portable physical storage medium for offline transport to said secondary for upload;
    synchronizing data at said secondary with data at said primary using an online link in response to a request for synchronization from said secondary;
    storing, in a metadata component, a dirty state indicator of a portion of a storage space at said primary after establishment of said remote copy relationship at said primary; and
    said metadata component being operable to limit synchronization of said secondary copy when uploading said tertiary copy from said portable physical store medium at said secondary to said portion of storage having said dirty state indicator at said primary.

9. A method as claimed in claim 8, wherein said metadata component comprises a bitmap and said portion of said storage space is a grain of data.

10. A method as claimed in claim 8, wherein said storage apparatus is further operable as a secondary in a remote copy pair and comprising steps of:
    uploading said tertiary copy from said portable physical storage medium;
    suppressing synchronization from a metadata component in said secondary; and
    requesting synchronization of data at said secondary with data at said primary using an online link.

11. A method as claimed in claim 8, wherein said online link comprises a storage area network.

12. A method as claimed in claim 8, wherein said step of creating a tertiary copy of a storage space comprises using a Flash Copy component.

13. A computer program product comprising computer program code tangibly embodied in a computer-readable storage medium to, when loaded into a computer system and executed thereon, cause said computer system to operate a storage apparatus as primary in a remote copy pair by performing the computer program code steps of:
    establishing a remote copy relationship between said primary, storing a primary copy and a secondary, storing a secondary copy;
    creating a tertiary copy of a storage space for download onto a portable physical storage medium for offline transport to said secondary for upload;

synchronizing data at said secondary with data at said primary using an online link in response to a request for synchronization from said secondary;

storing, in a metadata component a dirty state indicator of a portion of a storage space at said primary after establishment of said remote copy relationship at said primary; and limiting, by said metadata component, synchronization of said secondary copy when unloading said tertiary copy from said portable physical storage medium at said secondary to said portion of storage having said dirty state indicator at said primary.

14. A computer program product as claimed in claim 13, wherein said metadata component comprises a bitmap and said portion of said storage space is a grain of data.

15. A computer program product as claimed in claim 13, wherein said storage apparatus is further operable as a secondary in a remote copy pair and comprising further computer program code steps of:

uploading said tertiary copy from said portable physical storage medium;

suppressing synchronization from a metadata component in said secondary; and requesting synchronization of data at said secondary with data at said primary using an online link.

16. A computer program product as claimed in claim 13, wherein said online link comprises a storage area network.

17. A computer program product as claimed in claim 13, wherein said computer program code step of creating a tertiary copy of a storage space comprises using a Flash Copy component.

18. A method of deploying a computerized business continuity service by operating a customer storage apparatus as primary in a remote copy pair comprising the steps of:

establishing a remote copy relationship between said primary, storing a primary copy and a secondary, storing a secondary copy;

creating a tertiary copy of a storage space for download onto a portable physical storage medium for offline transport to said secondary for upload;

synchronizing data at said secondary with data at said primary using an online link in response to a request for synchronization from said secondary;

storing, in a metadata component, a dirty state indicator of a portion of a storage space at said primary after establishment of said remote copy relationship at said primary; and said metadata component being operable to limit synchronization of said secondary copy when unloading said tertiary copy from said portable physical storage medium at said secondary to said portion of storage having said dirty state indicator at said primary.

19. A method as claimed in claim 18, wherein said metadata component comprises a bitmap and said portion of said storage space is a grain of data.

20. A method of deploying a computerized business continuity service as claimed in claim 18, wherein a supplier storage apparatus is operable as a secondary in a remote copy pair and comprising steps of:

uploading said tertiary copy from said portable physical storage medium;

suppressing synchronization from a metadata component in said secondary; and requesting synchronization of data at said secondary with data at said primary using an online link.

21. A method of deploying a computerized business continuity service as claimed in claim 18, wherein said online link comprises a storage area network.

22. A method of deploying a computerized business continuity service as claimed in claim 18, wherein said step of creating a tertiary copy of a storage space comprises using a Flash Copy component.

* * * * *